United States Patent
Allen et al.

(10) Patent No.: US 10,933,959 B2
(45) Date of Patent: Mar. 2, 2021

(54) ANGLED LIGHT

(71) Applicant: Research & Design Innovations, LLC, Branford, CT (US)

(72) Inventors: Donald Terry Allen, Madison, CT (US); Kevin Hannula, Bloomington, IN (US)

(73) Assignee: Research & Design Innovations, LLC, Branford, CT (US)

( * ) Notice: Subject to any disclaimer, the term of this patent is extended or adjusted under 35 U.S.C. 154(b) by 0 days.

(21) Appl. No.: 16/805,234

(22) Filed: Feb. 28, 2020

(65) Prior Publication Data

US 2020/0277030 A1 Sep. 3, 2020

Related U.S. Application Data

(60) Provisional application No. 62/811,950, filed on Feb. 28, 2019.

(51) Int. Cl.
| | |
|---|---|
| *F21W 107/20* | (2018.01) |
| *B63B 45/04* | (2006.01) |
| *F21S 43/19* | (2018.01) |
| *B60Q 1/26* | (2006.01) |
| *F21V 19/00* | (2006.01) |

(52) U.S. Cl.
CPC ............ *B63B 45/04* (2013.01); *B60Q 1/2626* (2013.01); *F21S 43/195* (2018.01); *F21V 19/007* (2013.01); *F21V 19/0015* (2013.01); *F21W 2107/20* (2018.01)

(58) Field of Classification Search
CPC ... B63B 45/04; F21S 43/195; F21W 2107/20; F21V 19/0015; F21V 19/007; B60Q 1/2626
See application file for complete search history.

(56) References Cited

U.S. PATENT DOCUMENTS

| | | | | |
|---|---|---|---|---|
| 2,593,171 | A * | 4/1952 | Morse ..................... | B63B 45/02 362/477 |
| 2,966,579 | A * | 12/1960 | Malec ................... | B60Q 1/0408 362/369 |
| 4,219,871 | A * | 8/1980 | Larrimore ............... | B63B 45/04 362/264 |
| 4,429,350 | A * | 1/1984 | Guthrie ................... | F21L 14/00 362/109 |
| 5,664,866 | A * | 9/1997 | Reniger .................. | B63B 45/04 362/310 |
| 5,672,004 | A * | 9/1997 | Schmidt, Jr. ............ | B63B 45/02 362/421 |
| 5,704,704 | A * | 1/1998 | Reichard .............. | B60Q 1/2657 362/267 |

(Continued)

*Primary Examiner* — Zheng Song
(74) *Attorney, Agent, or Firm* — DeLio Peterson & Curcio; Thomas E. Ciesco

(57) ABSTRACT

An angled light for mounting on a surface of a marine vessel, the angled light having a base member including a first end including an opening for securing power supply wires in the angled light and a second end substantially perpendicular the first end. The angled light includes a light source disposed in the second end of the base member and a securing ring disposed on the first end of the base member for securing the first end of the base member to a surface opening on the marine vessel. The securing ring is engagable with the base member first end.

9 Claims, 3 Drawing Sheets

(56) References Cited

U.S. PATENT DOCUMENTS

| | | | | |
|---|---|---|---|---|
| 5,800,041 A | * | 9/1998 | Poggi | F21S 8/024 362/101 |
| 6,139,170 A | * | 10/2000 | Wiggerman | B60Q 1/26 340/984 |
| 10,701,922 B1 | * | 7/2020 | Larsson | F21V 23/003 |
| 2008/0165547 A1 | * | 7/2008 | Amor | F21V 29/767 362/373 |
| 2010/0002435 A1 | * | 1/2010 | Rash | F21V 31/005 362/235 |

* cited by examiner

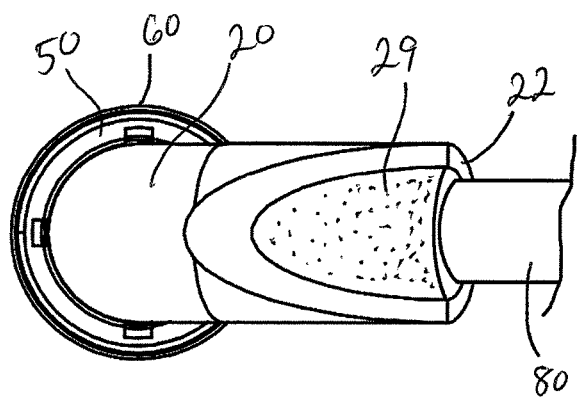
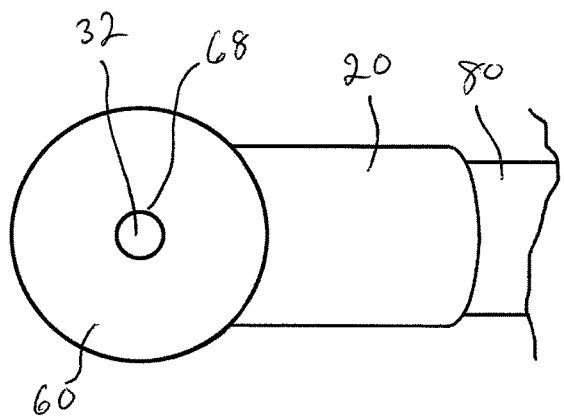
FIG. 4　　　　　　　　FIG. 5
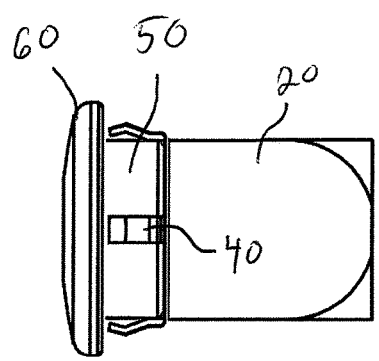
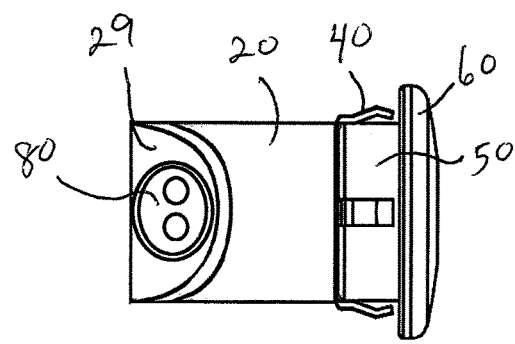
FIG. 6　　　　　　　　FIG. 7

ANGLED LIGHT

BACKGROUND OF THE INVENTION

1. Field of the Invention

The present invention relates to a light for illuminating the surface of a deck, wall, ceiling or other marine vessel or RV part.

2. Description of Related Art

Most light sources provided for marine vessels must be carefully installed to look professional, provide adequate lighting and maintain safety before, during and after installation. Since they generally include wiring extending from the rear of the light source, the depth of installation may be an issue.

SUMMARY OF THE INVENTION

Bearing in mind the problems and deficiencies of the prior art, it is therefore an object of the present invention to provide a clean, easy installation of a light source on a marine vessel without having to deal with issues such as the light source depth. Having the power supply wires extending perpendicular to the surface to which the angled light is mounted, the present invention requires no tools for installation and may be mounted quickly and neatly.

It is another object of the present invention to provide a light fixture for a marine vessel which requires minimal installation space along the back of the lighting fixture.

A further object of the invention is to provide marine vessel lighting which is easy to install.

It is yet another object of the present invention to provide a light fixture for lighting an area on a marine vessel.

It is still another object of the present invention to provide a light fixture which has the wiring extending at a right angle from the light source for installation in a marine vessel.

Still other objects and advantages of the invention will in part be obvious and will in part be apparent from the specification.

The above and other objects, which will be apparent to those skilled in the art, are achieved in the present invention which is directed to an angled light for mounting on a surface of a marine vessel comprising a base member having a first end including an opening for securing power supply wires in the angled light and a second end substantially perpendicular the first end. The angled light includes a light source disposed in the second end of the base member and a securing ring disposed on the first end of the base member for securing the first end of the base member to a surface opening on the marine vessel. The securing ring is engagable with the base member first end. The light source may be removably mounted in base member second end. The securing ring may include a circular base and a plurality of fingers extending substantially perpendicular to the base, the securing ring base engagable between the securing cap cylindrical wall and the second end of the base member. The securing cap and the fingers may secure the angled light within a surface opening on the marine vessel. The base member second end may include external base threads and the securing ring includes internal threads engagable with the external base threads. The angled light may include a finishing cap securable to the securing cap. The securing cap may include a cylindrical wall and internal cap threads disposed on an interior surface of the cylindrical wall, the internal cap threads engagable with external base threads on the base member. The angled light may include a securing ring having a circular base and a plurality of fingers extending substantially perpendicular to the base, the securing ring base engagable between the securing cap cylindrical wall and the second end of the base member.

Another aspect of the present invention is directed to an angled light fixture for mounting on a surface of a marine vessel. The angled light fixture includes a base member having a first end including an opening for securing power supply wires in the angled light and a second end substantially perpendicular the first end, the second end including external base threads. The angled light fixture includes a light source removably mounted in the second end of the base member and a securing cap having a cylindrical wall and internal cap threads disposed on an interior surface of the cylindrical wall, the internal cap threads engagable with the external base threads on the base member. The angled light fixture includes a finishing cap securable to the securing cap and a securing ring having a circular base and a plurality of fingers extending substantially perpendicular to the base, the securing ring base engagable between the securing cap cylindrical wall and the second end of the base member. The securing cap and the fingers secure the angled light within a surface opening on the marine vessel.

Another aspect of the present invention is directed to a method for mounting an angled light on a surface of a marine vessel. The method includes providing a base member having a first end including an opening for securing power supply wires in the angled light and a second end substantially perpendicular the first end, the second end including external base threads. The method includes providing a light source removably mounted in the second end of the base member and electrically contacting the power supply wires and providing a securing cap having a cylindrical wall and internal cap threads disposed on an interior surface of the cylindrical wall, the internal cap threads engagable with the external base threads on the base member. The method includes providing a finishing cap securable to the securing cap and a securing ring having a circular base and a plurality of fingers extending substantially perpendicular to the base, the securing ring base engagable between the securing cap cylindrical wall and the second end of the base member. The method includes ensuring the light source is mounted in the second end of the base member, ensuring the securing ring is engaged with the external base threads, the fingers extending in the direction away from the base member and placing the second end of the base member in an opening on a surface of the marine vessel whereby the fingers contact the marine vessel surface adjacent the opening. The method includes engaging the securing cap internal threads with the base member external threads and rotating the securing cap with respect to the base member, allowing the fingers to contact the marine vessel surface. The method includes tightening the securing cap to the base member, securing the base member to the marine vessel surface, engaging the finishing cap with the securing cap and supplying power to the power supply wires, illuminating the light source for providing lighting in the marine vessel.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a top plan view of the angled light shown in FIG. 1.

FIG. 5 is a bottom plan view of the angled light shown in FIG. 1.

FIG. 6 is a front elevational view of the angled light shown in FIG. 1.

FIG. 7 is a bottom elevational view of the angled light shown in FIG. 1.

DESCRIPTION OF THE EMBODIMENT(S)

In describing the embodiment of the present invention, reference will be made herein to FIGS. 1-10 of the drawings in which like numerals refer to like features of the invention.

Figure 1:
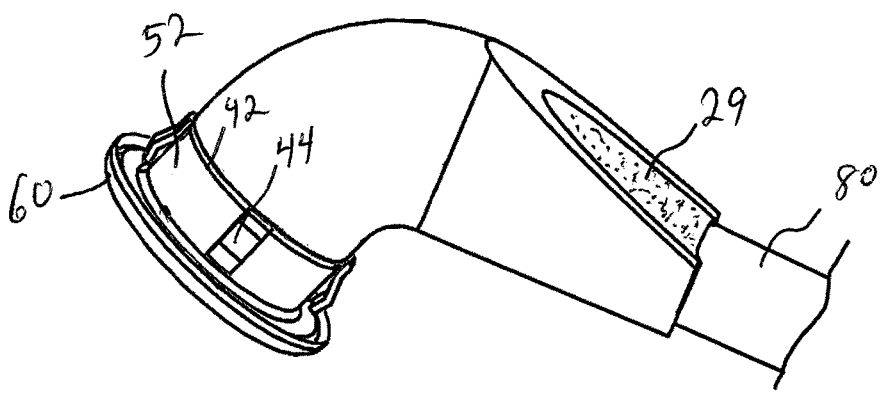
FIG. 1 is a perspective view of the angled light according to the present invention.
Figure 2:
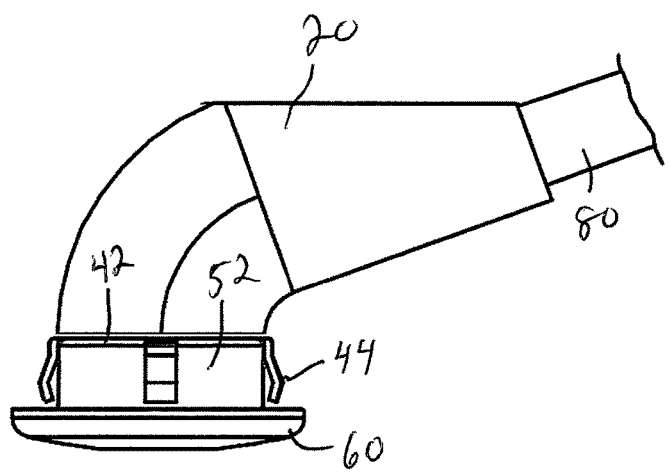
FIG. 2 is a right side elevational view of the angled light shown in FIG. 1.
Figure 3:
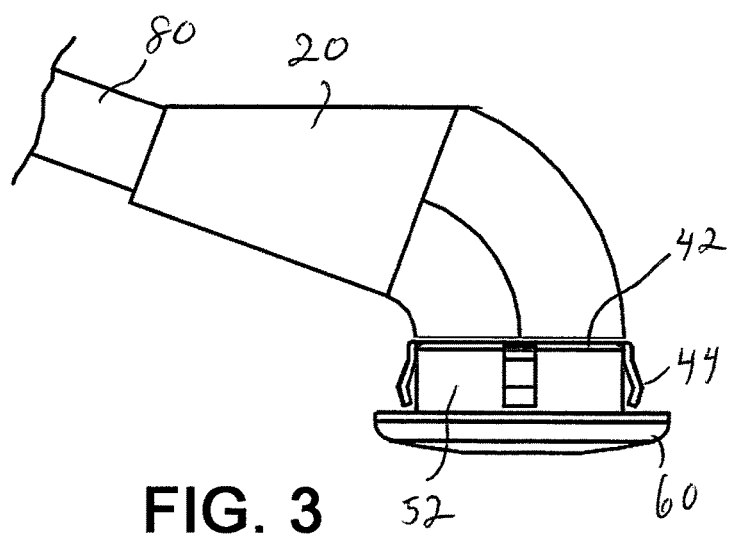
FIG. 3 is a left elevational view of the angled light shown in FIG. 1.
Figure 8:
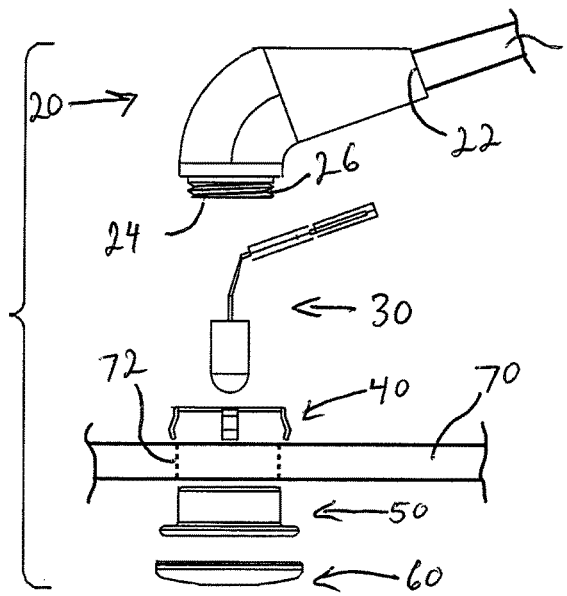
FIG. 8 is an exploded side view of the angled light shown in FIG. 1.
Figure 9:
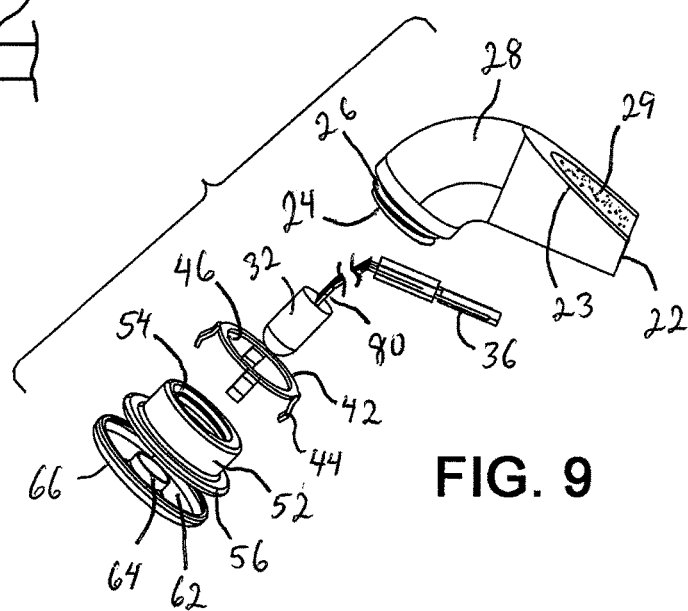
FIG. 9 is an exploded perspective view of the angled light shown in FIG. 1.
Figure 10:
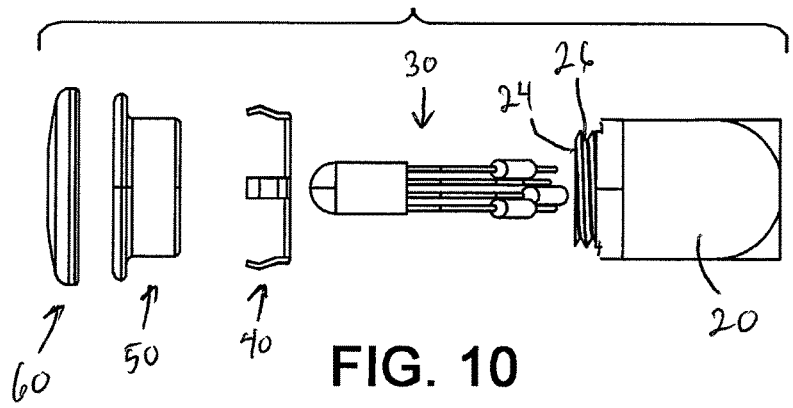
FIG. 10 is an exploded front view of the angled light shown in FIG. 1.

FIGS. 1-7 show an assembled angled light 10 and FIGS. 8-10 are exploded views of the angled light showing the features of each angled light component. The present invention is an angled light 10 for mounting on a surface 70 of a marine vessel. The angled light 10 includes a base member 20 having a first end 22 including a wire feed opening 23 for securing power supply wires 80 in the angled light 10 and a second end 24 substantially perpendicular the first end 22, the second end 24 including external base threads 26. The angled light 10 includes a light source 30 removably mounted in the second end 24 of the base member 20. The light source 30 may include a lamp 32 such as an incandescent bulb or an LED. Power supply wires 34 extend from the lamp 32 for supplying electrical power to the lamp 32 and may include a connector 36 at the end of the wires 80 opposite the lamp 32. An epoxy, glue or other cement 29 may be used to secure the wires 80 in the base member 20. The cement 29 may extend internally from the first base member end 22 to the second base member end 24, securing both the lamp 32 and the power supply wires 34. A portion of the wires 80 may also be fixed within the base member 20 with the cement 29. The connector 36 provides a simple connection to power wire on a marine vessel and may provide a water-resistant connection. The angled light 10 includes a securing cap 50 having a cylindrical wall 52 and internal cap threads 54 disposed on an interior surface of the cylindrical wall 52, the internal cap threads 54 engagable with the external base threads 26 on the base member 20. A securing cap flange 56 extends outwardly from the cylindrical wall 52, the cap flange 56 secured against the surface 70 when the angled light is installed. The securing cap 50 includes a cap opening 58 for allowing light to pass from the lamp 32. The angled light 10 includes a finishing cap 60 securable to the securing cap 50. A cylindrical hollow protrusion 64 extends from an inside surface 62 of the finishing cap 60 and may engage the securing cap opening 58 for securing the finishing cap 60 to the securing cap 50. Alternately, the finishing cap 60 may include a rim lip 66 which engages the securing cap flange 56 for securing the finishing cap 60 on the securing cap 50. The angled light 10 includes a securing ring 40 having a circular ring base 42 and a plurality of fingers 44 extending substantially perpendicular to the base 42. The securing ring base 40 has a central opening 46 and is engagable between the securing cap cylindrical wall 52 and the second end of the base member 24 by inserting the external treads 26 through the securing ring central opening 46. The securing cap flange 56 and the fingers 44 secure the angled light 10 within a surface opening 72 on the marine vessel surface 70.

Another aspect of the present invention is directed to a method for mounting the angled light 10 on a surface 70 of a marine vessel. The method includes ensuring the light source 30 is mounted in the second end 24 of the base member 20 and that the securing ring 40 is engaged with the external base threads 26, the fingers 44 extending in the direction away from the base member 20. The method includes placing the second end 24 of the base member 20 in an opening 72 on a surface 70 of the marine vessel whereby the fingers 44 contact the marine vessel surface 70 adjacent the opening 72 and engaging the securing cap internal threads 54 with the base member external threads 26. The method includes rotating the securing cap 50 with respect to the base member 20, allowing the fingers 44 to contact the marine vessel surface 70, tightening the securing cap 50 to the base member 20. The method includes securing the base member 20 to the marine vessel surface 70 and engaging the finishing cap 60 with the securing cap 50. The method includes supplying power to the power supply wires 80, illuminating the light source 30 for providing lighting in the marine vessel.

Thus, the present invention provides one or more of the following advantages:

Provide a clean, easy installation of a light source on a marine vessel without having to deal with issues such as the light source depth. Having the power supply wires extending perpendicular to the surface to which the angled light is mounted, the present invention requires no tools for installation and may be mounted quickly and neatly.

Provide a light fixture for a marine vessel which requires minimal installation space along the back of the lighting fixture.

Provide marine vessel lighting which is easy to install.

Provide a light fixture for lighting an area on a marine vessel.

Provide a light fixture which has the wiring extending at a right angle from the light source for installation in a marine vessel.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An angled light for mounting on a surface of a marine vessel comprising:
   a base member having a first end including an opening for securing power supply wires in the angled light and a second end substantially perpendicular the first end;
   a light source disposed in the second end of the base member; and a securing cap disposed on the second end of the base member for securing the second end of the base member to a surface opening on the marine vessel;

wherein the securing cap is engagable with the base member first end; and wherein the base member second end includes external base threads and the securing cap includes internal threads engagable with the external base threads.

2. The angled light according to claim 1 wherein the light source is removably mounted in base member second end.

3. The angled light according to claim 1 including a securing ring having a circular base and a plurality of fingers extending substantially perpendicular to the circular base, the securing ring circular base engagable between the securing cap and the second end of the base member.

4. The angled light according to claim 3 wherein the securing cap and the securing ring fingers secure the angled light within a surface opening on the marine vessel.

5. The angled light according to claim 1 including a finishing cap securable to the securing cap.

6. The angled light according to claim 1 wherein the securing cap includes a cylindrical wall and the internal securing cap threads are disposed on an interior surface of the cylindrical wall.

7. The angled light according to claim 6 including a securing ring having a circular base and a plurality of fingers extending substantially perpendicular to the base, the securing ring base engagable between the securing cap cylindrical wall and the second end of the base member.

8. An angled light fixture for mounting on a surface of a marine vessel comprising:

a base member having a first end including an opening for securing power supply wires in the angled light and a second end substantially perpendicular the first end, the second end including external base threads;

a light source removably mounted in the second end of the base member;

a securing cap having a cylindrical wall and internal cap threads disposed on an interior surface of the cylindrical wall, the internal cap threads engagable with the external base threads on the base member;

a finishing cap securable to the securing cap; and a securing ring having a circular base and a plurality of fingers extending substantially perpendicular to the base, the securing ring base engagable between the securing cap cylindrical wall and the second end of the base member;

wherein the securing cap and the fingers secure the angled light within a surface opening on the marine vessel.

9. A method for mounting an angled light on a surface of a marine vessel comprising:

providing a base member having a first end including an opening for securing power supply wires in the angled light and a second end substantially perpendicular the first end, the second end including external base threads;

providing a light source removably mounted in the second end of the base member and electrically contacting the power supply wires;

providing a securing cap having a cylindrical wall and internal cap threads disposed on an interior surface of the cylindrical wall, the internal cap threads engagable with the external base threads on the base member;

providing a finishing cap securable to the securing cap;

providing a securing ring having a circular base and a plurality of fingers extending substantially perpendicular to the base, the securing ring base engagable between the securing cap cylindrical wall and the second end of the base member;

ensuring the light source is mounted in the second end of the base member;

ensuring the securing ring is engaged with the external base threads, the fingers extending in the direction away from the base member;

placing the second end of the base member in an opening on a surface of the marine vessel whereby the fingers contact the marine vessel surface adjacent the opening;

engaging the securing cap internal threads with the base member external threads;

rotating the securing cap with respect to the base member, allowing the fingers to contact the marine vessel surface;

tightening the securing cap to the base member, securing the base member to the marine vessel surface;

engaging the finishing cap with the securing cap; and supplying power to the power supply wires, illuminating the light source for providing lighting in the marine vessel.

* * * * *